United States Patent [19]

Hoshikawa et al.

[11] Patent Number: 4,640,583
[45] Date of Patent: Feb. 3, 1987

[54] DISPLAY PANEL HAVING AN INNER AND AN OUTER SEAL AND PROCESS FOR THE PRODUCTION THEREOF

[75] Inventors: Jun Hoshikawa; Yukihiro Iwashita, both of Shiojiri, Japan

[73] Assignee: Kabushiki Kaisha Seiko Epson, Japan

[21] Appl. No.: 632,180

[22] Filed: Jul. 19, 1984

[30] Foreign Application Priority Data

Jul. 22, 1983 [JP] Japan ................. 58-134044
Jul. 28, 1983 [JP] Japan ................. 58-138059
Sep. 27, 1983 [JP] Japan ................. 58-178434

[51] Int. Cl.⁴ ............................. G02F 1/13
[52] U.S. Cl. ................... 350/343; 350/320; 350/339 R
[58] Field of Search .................. 350/343, 320

[56] References Cited

U.S. PATENT DOCUMENTS

| | | | |
|---|---|---|---|
| 4,418,102 | 11/1983 | Ferrato | 350/343 X |
| 4,500,171 | 2/1985 | Penz et al. | 350/343 X |
| 4,514,041 | 4/1985 | Tanaka | 350/337 |
| 4,536,060 | 8/1985 | Takamatsu et al. | 350/343 |
| 4,548,475 | 10/1985 | Brendle et al. | 350/343 X |

Primary Examiner—John K. Corbin
Assistant Examiner—Richard F. Gallivan
Attorney, Agent, or Firm—Blum Kaplan Friedman Silberman & Beran

[57] ABSTRACT

A display panel having a pair of spaced apart flexible substrates and a display medium sandwiched therebetween. A multiple seal contains the display medium between the substrates and maintains the substrates in spaced separation. The multiple seal includes a first seal for strongly adhering to the substrates and a second seal for forming a low water permeability seal. A process for the production of a display panel having a pair of spaced apart flexible substrates and a display medium sandwiched therebetween. A first sealant which strongly adheres to the substrates is printed on the interior surface of one substrate. A second seal, which has low water permeability, is printed on the other substrate. A spacer is scattered on at least one of the substrates. The substrates are combined together and the sealants are cured to form a display panel.

56 Claims, 22 Drawing Figures

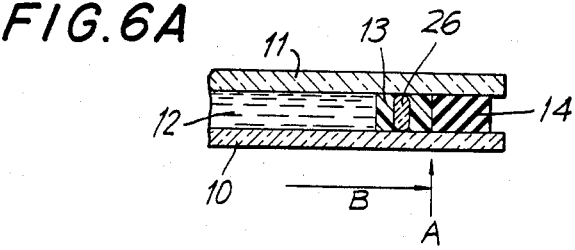
FIG.6A
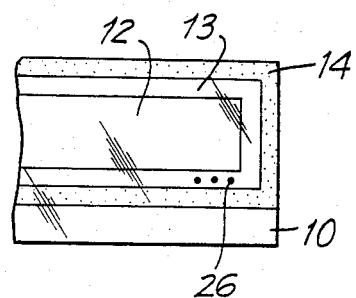
FIG.6B
FIG.7
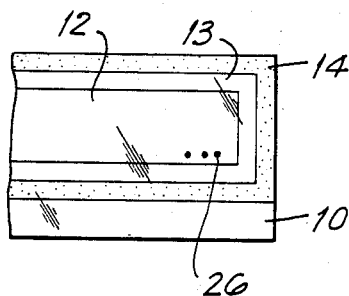
FIG.8
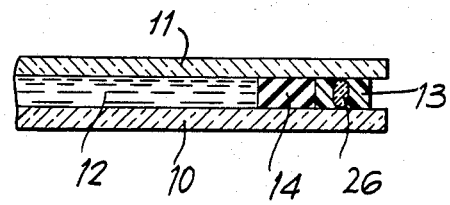

FIG. 11A
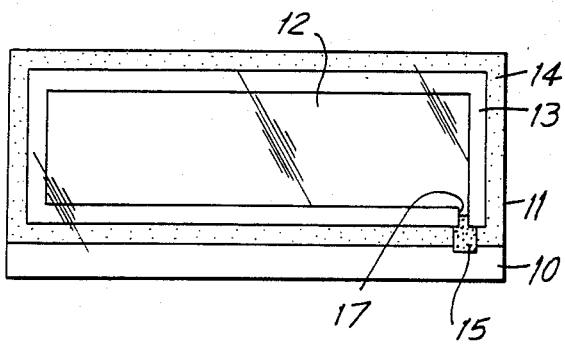
FIG. 11B
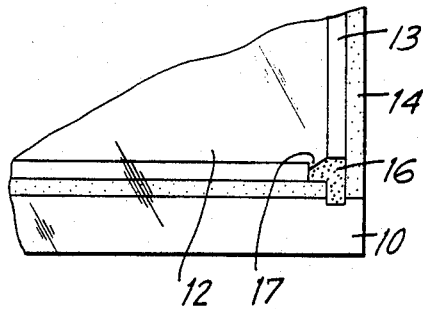
FIG. 12
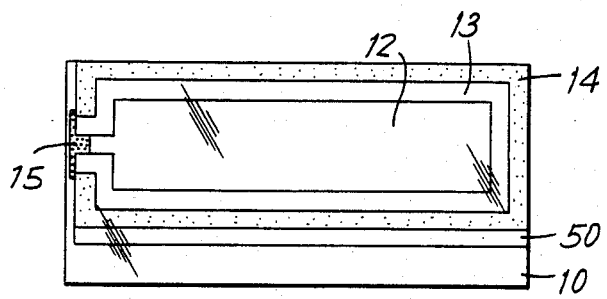
FIG. 13

DISPLAY PANEL HAVING AN INNER AND AN OUTER SEAL AND PROCESS FOR THE PRODUCTION THEREOF

BACKGROUND OF THE INVENTION

The present invention is generally directed to display panels and in particular to display panels using flexible substrates such as plastic film and processes for their production. A display panel, as used herein, is a pair of substrates having a display medium sandwiched therebetween which is controlled by an applied electric current, voltage, magnetism or other force. Examples of display panels include liquid crystal display panels, electrochromic display panels, EL(electroluminescence) display panels, electrophoretic display panels, magnetic display panels and others. The display medium sandwiched between the pair of substrates is not limited to a single layer but may have multiple layers as well. To avoid unnecessary repetition the description will be primarily directed to liquid crystal display panels although the invention is equally applicable to other types of display panels as noted above.

Various known methods exist for the production of flexible display panels for use with liquid crystals, by using plastic films. When a theremosetting epoxy resin, conventionally used with glass substrates is used on flexible plastic film substrates the weak adhesion of the thermosetting epoxy resin to the plastic substrate, caused, for example, by a lack of flexibility of the resin, causes the resin to peel off during the processing. This is particularly so where simultaneous construction of a plurality of panels using large substrates which are then cut into smaller, appropriate sizes is performed. As a result the reliability of these flexible display panels is particularly low.

On the other hand, where flexible adhesives having a high peel strength, such as silicon or urethane type adhesives are used other disadvantages are present. The silicon type adhesive has both a high gas and vapor permeability and tends to result in bubbles in the liquid crystal layer in a durability test. The urethane type adhesive causes the display panel to have a short service life, e.g., a liquid crystal display, since a urethane type adhesive tends to have a large reactive influence on the liquid crystal composition.

Accordingly, there is a need for a display panel composed of flexible substrate which has a long service life and is able to reliably survive bending of the display panel, e.g. a liquid crystal using flexible bases such as plastic bases and also to improve the production thereof.

SUMMARY OF THE INVENTION

Generally speaking, in accordance with the invention a display panel having a pair of spaced apart flexible substrates with a display medium sandwiched therebetween is provided. A multiple seal for containing the display medium between the substrates maintaining the substrates in spaced separation includes a first seal for strongly adhering to the substrates and a second seal for forming a low water permeability seal.

The process for production of a display panel having a pair of spaced apart flexible substrates and display medium sandwiched therebetween is also provided. A first sealant which strongly adheres to the substrates is printed on the interior surface of one substrate. A second seal, which has low water permeability, is printed on the other substrate. A spacer is scattered on at least one of the substrates. The substrates are then combined together and the sealants are cured to form a display panel.

Accordingly, it is an object of the invention to provide an improved display panel and process for the production thereof.

Another object of the invention is to provide an improved display panel and a process for the production thereof which is flexible and able to withstand repeated bending.

A further object of the invention is to provide an improved display panel constructed from flexible substrates.

Still another object of the invention is to provide a display panel and a process for the production thereof which provides a flexible, strong and water tight seal around the display medium.

Yet another object of the invention is to provide a display panel and process for the production thereof which provides an improved seal around the display medium.

Yet another object of the invention is to provide a display panel and the process for the production thereof which has a multiple seal, one portion of which is strongly adhesive to the substrates and another portion of which has low water permeability.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6A is a partial cross-sectional view of a liquid crystal display panel constructed in accordance with another embodiment of the invention;

FIG. 6B is a partial top plan view of the liquid crystal display panel of FIG. 6A;

FIG. 7 is a partial top plan view of a liquid crystal display panel constructed in accordance with another embodiment of the invention;

FIG. 8 is a partial cross-sectional view of an alternate embodiment of a liquid crystal display panel constructed in accordance with the invention;

FIG. 11A is a top plan view of a liquid crystal display panel constructed in accordance with another embodiment of the invention;

FIG. 11B is a partial top plan view of an alternate embodiment of a liquid crystal display panel constructed in accordance with the invention;

FIG. 12 is a top plan view of a liquid crystal display panel constructed in accordance with another embodiment of the invention;

FIG. 13 is partial cross-sectional view of a liquid crystal display panel constructed in accordance with an alternate embodiment of the invention.

DETAILED DESCRIPTION OF THE PREFERRED EMBODIMENT

Figure 1:
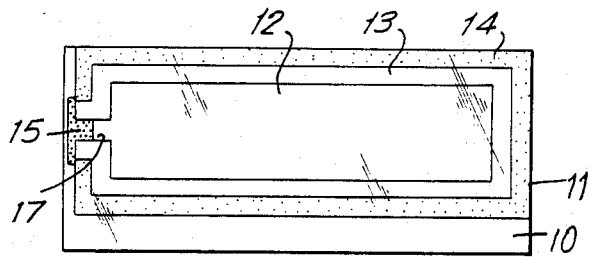
FIG. 1 is a top plan view of a liquid crystal display panel constructed in accordance with the invention.

The display panels constructed in accordance with this invention are composed of a display medium layer, a pair of flexible substrates sandwiching the display medium layer and a multiple structure seal. At least one part of the multiple seal is constructed of a resin having strong adhesion to the flexible substrates and another part is made of a resin having low water permeability. This separation of functions is usually necessary because resins having strong adhesions to the flexible substrates are generally high in water permeability. Where the resin which strongly adheres to the flexible substrate has high water permeability it is desirable that it have low gas permeability.

The term seal as used herein means for the resins having low water permeability an assembly constructed so that at least one layer of the low water permeability resin completely surrounds the liquid crystal or other display medium layer except at the liquid crystal, or other display medium, inlet. However, the resin having strong adhesion to the substrate need not be continuously formed around the liquid crystal layer. In other words, a part of the "seal" formed by the strongly adhesive resin may be partially discontinuous.

The seal structure is formed of multiple components, e.g. two, three, four or the like layers. In general, however, the 2-layer form is preferable because the narrowest width seal can be achieved and it is easiest to produce.

One way of forming the seal is to have the sealing member on the liquid crystal layer side made of the low water permeability resin and the outer side sealing member being made of the strongly adhesive resin. However, it is also possible to reverse the relative placement of the seal parts.

Flexibility is herein defined as the property of a substance which prevents it from being easily broken when bent and remaining undamaged even when the substrate has a curvature imparted to it.

It is generally preferable if the sealing member on the liquid crystal layer side of the seal is made of a material which does not easily react with the liquid crystal. However, there should be no problem if the reaction with the sealing member is completed during the assembly of the display cell and before the liquid crystal is introduced.

It is preferable that the low water permeability resin used be either an epoxy type resin or an anaerobic ultraviolet curing resin. The anaerobic ultraviolet curing resin is preferably acrylic.

The resin which strongly adheres to the flexible base is preferably selected from the group consisting of silicone type resins, urethane type resins, flexible epoxy type resins and polyester type resins.

Among these resins a preferred combination is using an epoxy type resin for the low water permeability resin and a silicone type resin for the strongly adhesive resin.

It is also possible to construct the multiple part seal using a relatively non-reactive resin as the sealing member on the liquid crystal layer side and the low water permeability resin as the outer sealing member. In this situation the relatively non-reactive resin and the strongly adhesive, low-water permeability resin are formed so as to completely surround the liquid crystal layer except at the liquid crystal inlet. Of the aforenoted resins strongly adhesive to the flexible substrates the silicone type resins and flexible epoxy type resins tend not to easily react with the liquid crystal. Of these, the silicone type resins are least reactive with the liquid crystal.

The flexible substrates used in the display panels in accordance with the invention are selected from the group consisting of: polyester type resins; cellulose type resins such as cellulose diacetate, cellulose triacetate, cellulose acetate butyrate, etc.; polyethersulfone type resins; polysulfone type resins; acrylic resins; polyethylene terephthalate type resins; phenoxy type resins; phenoxy-urethane type resins; urethane type resins; polyether ketone type resins; polyether ether ketone type resins; polyether imide type resins; epoxy type resins; polyimide type resins; polyamide type resins; polyimideamide type resins; polycarbonate type resins; resins obtained by mixing two or more of the above resins; and resins obtained by laminating two or more of the above resins. Also included are the above resins made into a film. Further, the above may be laminated on one side with an aluminum foil, an aluminum plate or deposited or spattered with aluminum, silver etc.

Especially in the case of liquid crystal display panels several additional examples of flexible substrates include a polyvinyl alcohol (PVA) film imparted with polarizability by incorporation of a dichromatic dye into the aforenoted plastic resin or film, a substrate of a polarizing plate type obtained by integrally laminating the PVA film with a cellulose acetate film, a substrate obtained by laminating with a polarizer comprising a K film, as well as a polarizing plate per se of, e.g., the above mentioned film.

The resin material for the aforenoted substrate (e.g. phenoxy type resin etc.) is highly transparent and also adheres well between the substrate and a transparent electrically conductive film (e.g. $SnO_2$, $InSo_3$, ITO etc.). A substrate produced using one of these materials has no optical rotation if fabricated using e.g. extrusion. Also, where monoaxial stretching is utilized in liquid crystal display panels optical rotation is acceptable where polarizing is accomplished by making the polarizing axis of the polarizer parallel or at right angles to the monoaxial stretching axis. Deviations of five degrees or less, and preferably two degrees or less from the parallel or right angle directions are substantially negligible. Monoaxial stretching is used, for example, in the preparation of substrates using polyethylene terephthalate type resins, (including the preparation of polarizer-integrated bases), etc.

The thickness of the substrates are about 0.025-1.5 mm. Where a thin liquid crystal display panel is desired a thickness of about 0.025-1 mm is preferred and more preferably about 0.05-0.2 mm.

The process for forming a display panel with the above described multiple parts sealed structure consists of forming two resins having different characteristics, one on each of the substrates by screen printing, gravure printing, offset printing, etc., and then combining the pair of substrates and subjecting them to a heat reaction.

The invention is more particularly described by the following examples directed to various embodiments constructed in accordance with the invention.

EXAMPLE 1

Figure 2:
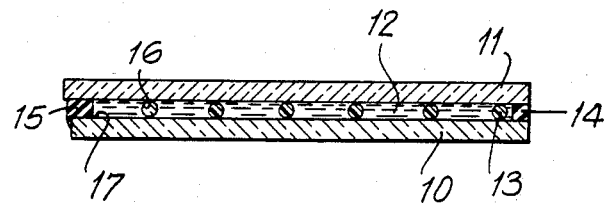
FIG. 2 is a cross-sectional view of the liquid crystal display panel of FIG. 1.

Reference is made to FIGS. 1 and 2 wherein a liquid crystal cell constructed in accordance with an embodiment of the invention is depicted. The liquid crystal cell has plastic substrates 10, 11 a liquid crystal composition 12, and epoxy type adhesive seal part 13 and a silicone type adhesive seal part 14. A sealant 15 covers a liquid crystal inlet 17. A gap agent 16 is used to maintain a uniform liquid crystal layer thickness.

Figure 3:
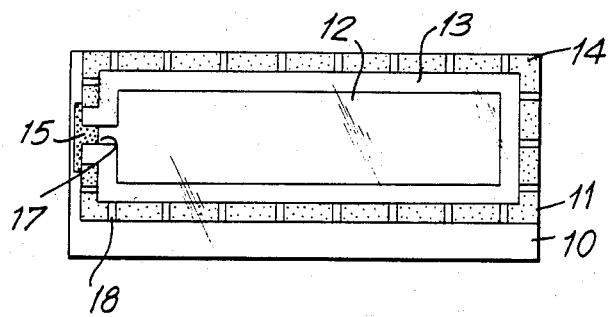
FIG. 3 is a top plan view of a liquid crystal display panel constructed in accordance with another embodiment of the invention.
Figure 4:
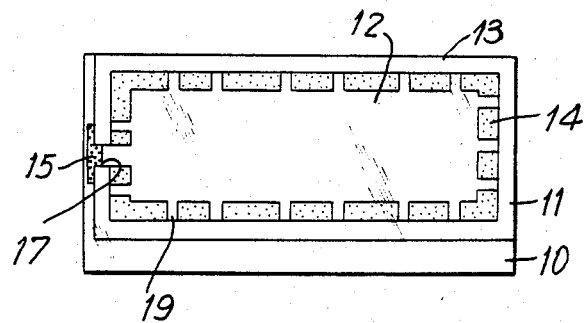
FIG. 4 is a top plan view of a liquid crystal display panel constructed in accordance with another embodiment of the invention.

As noted above, by making the seal a double layered structure the lack of adhesion to plastic suffered by epoxy type adhesives is avoided by also utilizing a silicone type adhesive. Silicone type adhesive 14 need not completely encircle epoxy type adhesive 13, as shown in FIG. 1, and is satisfactory even when it is discontinuous as shown in FIGS. 3, 4.

A structure similar to the embodiment of FIG. 1 was produced except that the relative positioning of epoxy type seal part 13 and silicone type adhesive 14 was reversed. In this case the silicone type adhesive is in contact with liquid crystal composition 12 and epoxy type adhesive 13 is formed on the outside of the cell. This configuration is highly reliable and forms a good bond. However, under the stress of a severe bending test the epoxy resin at the edge of the cell tends to peel off and is, as a result, less flexible than the above described structure.

A double layered seal was formed by screen printing an epoxy type adhesive on one substrate and screen printing a silicone type adhesive on the other substrate. A spacer 16 was added to at least one of the substrates. Then the two substrates were combined and heated to cure the adhesives easily forming a double layered seal structure.

EXAMPLE 2

Reference is next made to FIGS. 3, 4 wherein alternate embodiments of liquid crystal display panels prior to final assembly in accordance with the invention are depicted, like elements having like reference numerals. If rings 13 and 14 of the multiple seal are made completely continuous around liquid crystal display composition 12 air tends to be trapped between seal parts 13, 14. The trapped air can lead to a fluctuation in cell thickness, a deterioration of display quality due to bubble formation in the display medium, etc. By forming cuts on one of the multiple seal parts air is not trapped between the inner and outer seal part. In this configuration where one of the seals is printed and also provided with cut regions when upper and lower substrates 10, 11 are laminated the discontinuous seals are squeezed thereby expelling the air present between the adjacent seal parts and giving a continuous seal in the final construction.

As noted in this example the multiple seal is preferably constructed by screen printing different resins on the respective substrates and combining the substrates to form a cell. A process which forms a seal on the inner side of the cell as it is being assembled and subsequently impregnates it with an outer sealing material does not produce desirable results.

Flexible substrates are generally used to make thin display devices and if the device is thin, the impregnated resin tends to stick to undesirable locations. The resin has a tendency to stick to the top and rear surfaces of the cell thereby causing the cell to become thicker in these regions causing a fluctuation in the thickness of the display composition and as a result a fluctuation in the thickness of the display device. Where glass substrates are used the excess resin can be removed by, for example, a metal blade. However, if flexible substrates are used, the substrate surfaces tend to scratch when attempts are made to remove the resin and the quality of the display is deteriorated and possibly damaged.

Substrates 10, 11 were formed of $100\mu$ thick polyether sulfone film with an indium oxide-tin oxide transparent electrically conductive film 500 Å thick formed thereon using a low temperature spattering method. Thereafter, a predetermined pattern was formed by photolithography, an orientating agent was coated, calcined and rubbed in the predetermined direction with gauze. Thereafter, an epoxy type adhesive was screen printed on one of the substrates and a silicone type adhesive was screen printed on the other substrate and then a spacer was scattered on the substrates. The substrates were then combined and heated to cure the adhesives. The cell was filled with a liquid crystal substance by a vacuum injection method. Then the inlet was sealed with a room temperature epoxy resin type adhesive.

Figure 5A:
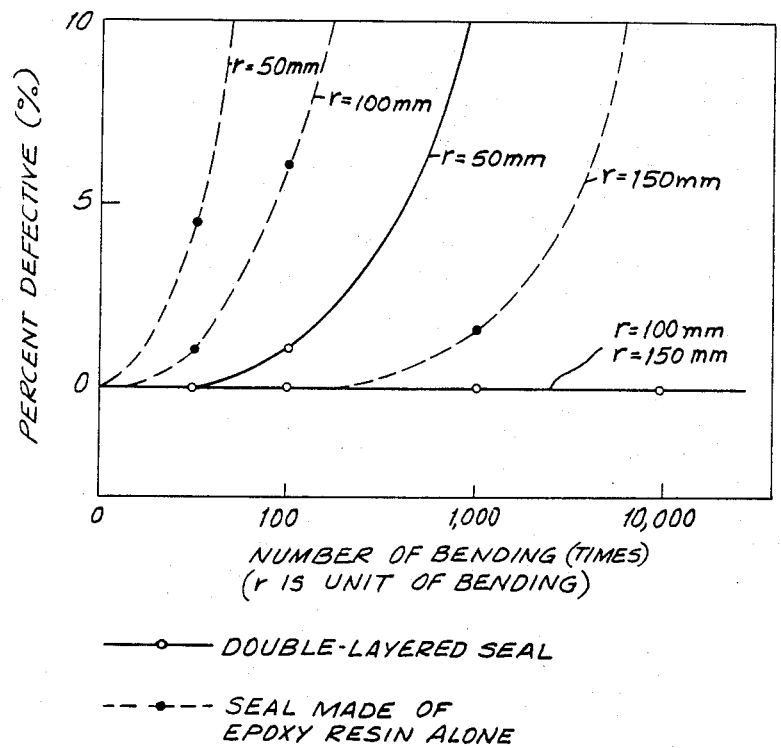
FIG. 5A is a graphical representation of a bending test of liquid crystal display panels having flexible substrates.

The bending resistance of the resulting display panel is shown in FIG. 5A. The number of bendings that were endured depended on the bending radius. For example, when the cell was bent to a radius of 100 mm or greater a durability of 10,000 times or more without any defective cells was achieved, which is a commercially practical level. These results show that the double-layered seal is far superior to the seal formed with only an epoxy type resin.

Where the seal is composed of a double layered seal and the seal on the liquid crystal layer side is of the silicone type resin and the outer sealing member is the epoxy type resin, the bending versus percent defective characteristic curve lies between the solid line (double layered seal with epoxy resin on the inside) and the dotted line (only epoxy resin), for any given bending radius. As a result the flexibility characteristics of the double layered seal where the silicone type resin is on the liquid crystal layer side of the double seal, while not as flexible as the double layer seal, with the epoxy type resin on the liquid crystal layer side, is more flexible than a single epoxy resin seal.

In addition, the liquid crystal and the sealing member do not easily react and water and other deleterious substances do not easily invade the liquid crystal composition from outside of the outer seal of the double layered seal and the deterioration of the liquid crystal is greatly reduced.

EXAMPLE 3

A liquid crystal display cell was formed using a silicone type resin, as the resin having the low reactivity, on the liquid crystal layer side. The outer seal was formed using an epoxy type resin which has low water permeability. Both the epoxy type resin and the silicone type resin were formed in a continuous manner before the final assembly of the display cell. The display panel was otherwise produced similarly to the display panel of Example 1.

Figure 5B:
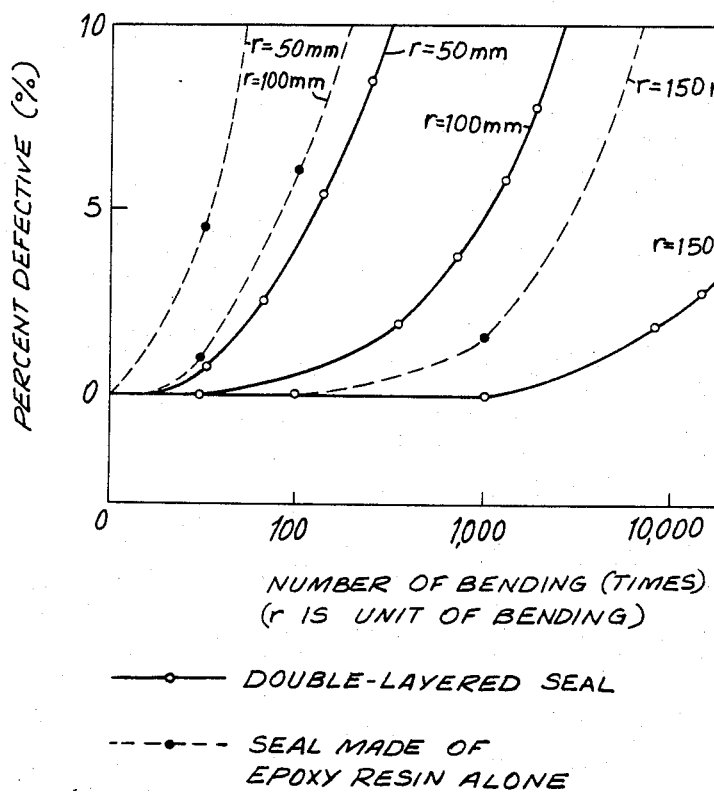
FIG. 5B is a graphical representation of a bending test of liquid crystal display panels having flexible substrates.

The bending resistance of this display panel is shown in FIG. 5B. While the number of durable bendings varies depending on the bending radius, the results for the double layered seal are significantly superior to the result for the single layered epoxy seal. For example, where r=150 mm there were no poor results out of the 100 specimens tested in a one thousand time bending test and fewer than 5% were defective in a ten thousand time bending test.

EXAMPLE 4

A display panel was produced similarly to the display panel of Example 1 except that the spacer in example 1 was replaced by a plastic fiber.

EXAMPLE 5

A display panel is produced similarly to the display panel of Example 1 except that the spacer in example 1 was replaced by a glass spacer, such as glass beads, glass fiber, etc.

EXAMPLE 6

A display panel was produced similarly to the display panel of Example 1 except that the spacer in Example 1 was replaced by plastic balls.

EXAMPLE 7

A display panel was produced similarly to the display panel of Example 1 except that the spacer was uniformly distributed on the substrate by placing the substrate in the gas atmosphere in which the spacer material was suspended.

EXAMPLE 8

A display panel was produced similarly to the display panel of Example 1 except that the spacer was uniformly distributed on the substrate by placing the substrate in the liquid containing the suspended spacer and withdrawing it at a constant rate.

EXAMPLE 9

A display panel was produced similarly to the display panel of Example 1 except that the spacer was uniformly distributed on a substrate by spraying a solution of the spacer and a volatile solvent over the substrate using a sprayer.

EXAMPLE 10

A display panel was produced similarly to the display panel of Examples 1-8 except that a sealing member was printed on one of the orientated substrates, an upper-lower conductive member was applied and the spacer was distributed on the substrate. Separately the other sealing member was printed on the other orientated substrate and the spacer was distributed on that substrate. Then, both substrates were laminated to integrate them.

The upper-lower conductive member is the electrically conductive member which electrically connects the electrodes respectively formed on the pair of substrates sandwiching the display medium. Examples include electrically conductive adhesives incorporating an electrically conductive metal powder, such as silver, aluminum, gold, copper, etc., and plastic fiber balls, glass fiber balls which are coated with a metal or other electrically conductive substance. The diameter of these conductive members can be as large as the thickness of the display medium.

EXAMPLE 11

A display panel was produced similarly as in Examples 1-8 except for the following differences. One of the sealing members was printed on one of the orientated substrates, then the spacer was distributed on that substrate and an upper-lower conductive member was applied. Separately, the other sealing member was printed on the other orientated substrate and both bases were laminated to integrate them.

EXAMPLE 12

A display panel was produced similarly to the display panels of Examples 1-8 except for the following differences. One of the sealing members was printed on one of the orientated substrates, an upper-lower conductive member was applied to the substrate and the spacer was distributed on the substrate. Then this first substrate was laminated with the other orientated substrate which had been printed with the other sealing member, thereby integrating the substrates.

EXAMPLE 13

A display panel was produced similarly to the display panels of Examples 1-8 except for the following differences. A sealing member was printed on one of the orientated substrates and then the spacer was distributed on the substrate. Separately, the other sealing member was printed on the other orientated substrate and an upper-lower conductive member was applied. Thereafter both substrates were laminated to integrate them.

EXAMPLE 14

A display panel was produced similarly to the display panels of Examples 1-8 except for the following differences. A sealing member was printed on one of the orientated bases, a spacer was distributed on the substrate and an upper-lower conductive member was applied to the substrate. Thereafter, this substrate was laminated with the other orientated substrate which had been printed with the other sealing member, thereby integrating the substrates.

EXAMPLE 15

A display panel was produced similarly to the display panels of Examples 1-13 except for the following differences as depicted in the embodiments of FIGS. 6A, 6B. An upper-lower conductive part 26 was formed within the water permeability seal part 13 (epoxy type resin). The sealed part composed of a resin which is strongly adhesive to the substrate (silicone type resin) 14 was formed on the outer side of seal part 13. Upper-lower conductive part 26 was formed on a portion B inside a boundary A between seal parts 13, 14.

EXAMPLE 16

A display panel was produced similarly to the display panels of Examples 1-13 except for the following differences, as depicted in the embodiment of FIG. 7. Upper-lower conductive part 26 was formed within liquid crystal layer 12 rather than in seal part 13, which is strongly adhesive to the substrate (silicone type resin), or in outer seal part 14, having low water permeability (epoxy type resin).

EXAMPLE 17

A display panel as produced similarly to the display panels of Examples 1-13 except for the following differences, as depicted in the embodiment of FIG. 8. Seal part 14, having strong adhesion to the substrates was formed on the inside (on the liquid crystal layer side) and the low water permeability seal part 13 (epoxy type resin), was formed on the outside, the reverse of the embodiments of FIGS. 6A, 6B. In addition, upper-lower conductive part 26 was formed within seal part 13 on the outer side of the multiple part seal.

EXAMPLE 18

A display panel was produced similarly to the display panels of Examples 1-13 except for the following differences, as depicted in the embodiments of FIGS. 9A, 9B, 9C, 9D. These liquid crystal display panels have a three-part seal composed of a single low water permeability seal part 13 sandwiched between inner and outer strongly adhesive seal parts 14.

Figure 9A:
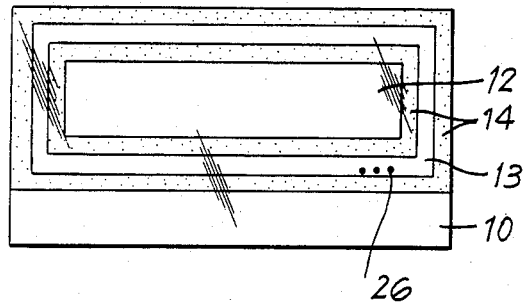
FIG. 9A is a top plan view of another embodiment of a liquid crystal display panel constructed in accordance with the invention.

The three layered seal, as shown in 9B, 9C, 9D may have cuts 19 on inner and outer strongly adhesive seal parts 14. However, it was also possible for cuts 19 to be present prior to assembly of the multiple seal but to disappear during assembly and form a continuous three part seal as shown in FIG. 9A.

Figure 9B:
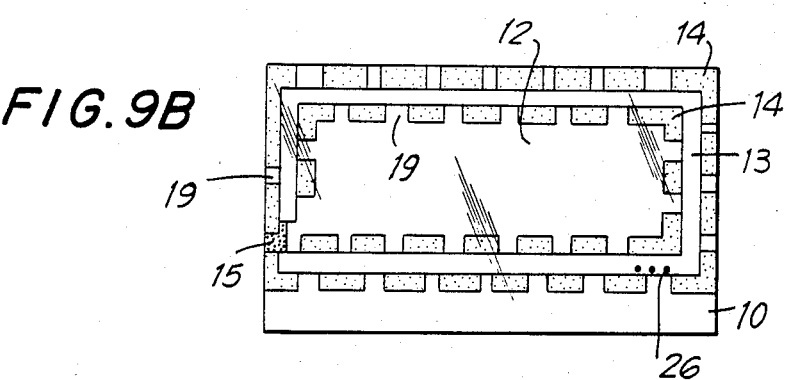
FIG. 9B is a top plan view of the liquid crystal panel of FIG. 9A prior to final assembly.
Figure 9C:
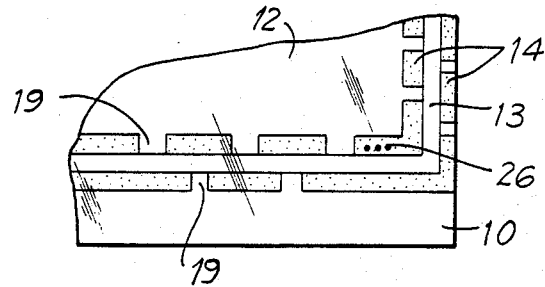
FIG. 9C is a partial top plan view of an alternate embodiment of the liquid crystal display panel of FIG. 9A.
Figure 9D:
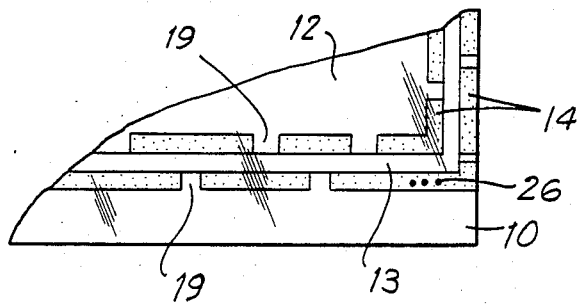
FIG. 9D is a partial top plan view of another embodiment of the liquid crystal display panel of FIG. 9A.

Upper-lower conductive part 26 was located in low water permeability seal part 13 as shown in FIG. 9B. Upper-lower conductive part 26 was also placed in the inner, strongly adhesive seal part 14 as shown in FIG. 9C. Finally, upper-lower conductive part 26 was located in the outer, strongly adhesive seal part 14 as shown in FIG. 9D.

EXAMPLE 19

Figure 10A:
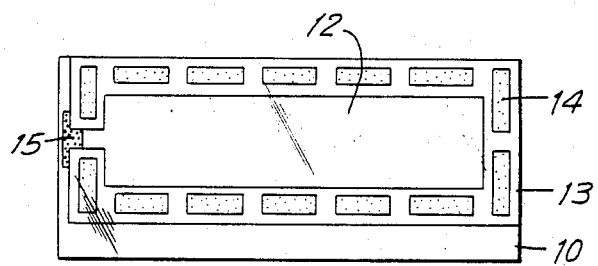
FIG. 10A is a top plan view of an alternate embodiment of a liquid crystal display panel constructed in accordance with the invention.
Figure 10B:
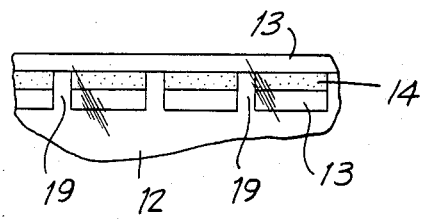
FIG. 10B is a partial cross-sectional view of a liquid crystal display panel constructed in accordance with an embodiment of the invention prior to final assembly.
Figure 10C:
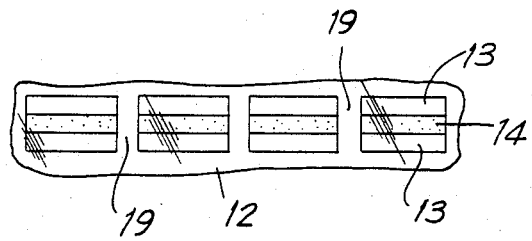
FIG. 10C is a partial cross-sectional view of a liquid crystal display panel constructed in accordance with another embodiment of the invention prior to final assembly.

A display panel was produced similarly to the display panels of Examples 1-13 except for the following differences, as depicted in the embodiments of FIGS. 10A, 10B, 10C. In FIG. 10A strongly adhesive seal part 14 is located entirely within low water permeability seal part 13. It is not necessary for strongly adhesive seal part 14 to be continuous because its sole function is to ensure that spacers 10, 11 remain firmly attached. However, low water permeability seal part 13 must be continuous when finally assembled to prevent the movement of water across the multiple seal.

Cuts 19 may be made in two or three layers of seal parts 13, 14 prior to the bonding of upper and lower substrates 10, 11 (FIGS. 10B, 10C). The bonding process can then provide a continuous seal, as shown in FIG. 10A after final assembly.

EXAMPLE 20

A display panel was produced similarly to the display panels of Examples 1-13 except for the following differences, as depicted in the embodiments of FIGS. 11A, 11B. As shown in FIG. 11A, liquid crystal inlet 15 was formed on the terminal part side. The shape of inlet 17 through multiple seal parts 13, 14 is designed so that inlet sealant 15 cannot easily invade the liquid crystal display region. Particularly with the inlet shape and placement of FIG. 11B the sealant enters directly opposite low water permeability seal part 13 and is less likely to invade the inner portion of the display cell.

EXAMPLE 21

A display panel was produced similarly to the display panels of Examples 1-13 except for the following differences, as depicted in the embodiment of FIG. 12. Multiple seal parts 13, 14 were formed and an edge barrier 50 was provided between strongly adhesive seal part 14 and the edge of substrate 10. The liquid crystal display panel constructed in accordance with this embodiment was connected with a connecting sheet having a conductive passage (made of e.g. graphite, silver powder), and an adhesion layer (e.g. heat seal layer or adhesive layer) formed on a flexible plastic sheet by hot pressing (or by merely pressing), and connected with a drive circuit substrate.

Edge barrier 50 prevents seal part 14, which strongly adheres to the substrate, from forming an electrically insulating layer on the terminal. Edge barrier 50 may also be made of the same resin, as seal part 13, having low water permeability. By using the same material for barrier 50 and seal part 13 it is possible to form both elements in a single printing.

EXAMPLE 22

When producing display panels in accordance with the invention electrode patterns were formed on a pair of large-sized substrates, such that a plurality of display panels could be produced. One substrate was provided with a resin having a strong adhesion to the substrate and the other with a resin having low water permeability. Then the two substrates were laminated to give multiple layer seals and thereafter cut into individual display panels.

Reference is made to FIG. 13 wherein an electrode 7 and an orientating agent 8 formed on each of bases 10 and 11 are depicted. Electrode 7 and orientating agent 8 are not shown in FIGS. 1-12. However, in each of those embodiments they are formed as shown in FIG. 13. Electrode 7 is formed on each of substrates 10, 11 and an orientating agent 8 is coated on substrate 10, 11 over electrode 7 to impart orientation.

EXAMPLE 23

A display device having a thickness of 1 mm or less where the display element, as constructed in the above described examples, was connected to a drive circuit substrate having substantially the same thickness as the display panel. The power source for the display device was a solar battery having substantially the same thickness as the display panel, and formed on a substrate by a screen printing process, evaporation process or a sputtering process. The solar battery was connected to the drive circuit substrate. Such display devices are used for calculators, flat screen television sets, wrist watches, pocket watches, etc.

EXAMPLE 24

While constructing the display device of Example 23 the outer side of the display panel, the drive circuit substrate and the power source were covered with a plastic resin, such as polyester and polyvinyl resins.

While in the above examples silicone type resin was used as the resin strongly adhesive to the substrate and epoxy type resin was utilized as the resin having low water permeability, similar results can be obtained by using other resins selected from the aforementioned groups.

In constructing display panels having multiple seal parts it is possible to print low water permeability resin 13 in a discontinuous manner so that when the substrates are assembled air is allowed to escape from between seal parts 13, 14 and seal part 13 becomes continuous. It is further possible to print resins 13, 14 in a discontinuous manner and upon assembly cause low water permeability seal part 13 to form a continuous seal around the display medium.

Figure 14:
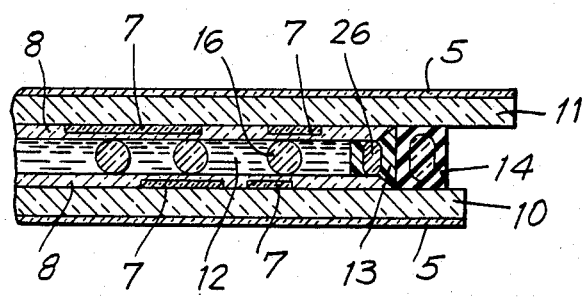
FIG. 14 is a partial cross-sectional view of a liquid crystal display panel constructed in accordance with an alternate embodiment of the invention.

In addition, when constructing a display panel having a flexible substrate in accordance with the invention the electrode substrates may be provided with a barrier layer 5 (FIG. 14) against passage of air or moisture. Barrier layer 5 prevents the passage of any substance deleterious to the display quality or display substance, such as air, moisture, etc. Although it is more desirable to prevent both air and moisture from breaching barrier layer 5 a viable display panel which is satisfactory for use in many circumstances can be produced by protecting against either air or moisture.

The display mediums 12 used in this invention are held between two substrates 10, 11 at least one of which is flexible. The display medium is protected against invasion by any deleterious substance from both the electrode surfaces 7 and the seal surface, thereby forming a highly reliable display panel.

Barrier layer 5 may be formed, for example, on the display medium surface (e.g. liquid crystal), side (hereinafter inside) of the electrode substrate on the opposite side (hereinafter outside) or on both sides.

Where the barrier layer is formed on the flexible substrates the seal may be either a single or a multiple structure. However, where a multiple seal structure is used a more reliable display panel is provided.

The barrier layer may be composed of an organic type barrier layer or an inorganic type barrier layer both of which are described in more detail below.

ORGANIC TYPE BARRIER LAYER

Various types of material may be used as the organic type barrier layer. They serve to prevent moisture or air from invading the display medium (e.g. liquid crystal) layer. The organic barrier layer may be formed on the inside or outside substrate surfaces.

When the barrier layer is formed on the inside substrate surface (i.e., the display medium layer side), the order of formation may be electrode substrate, electrode, barrier layer and finally orientated layer. It may also be electrode substrate, barrier layer, electrode and then orientated layer. In the former case the barrier layer may also act as the orientated layer. The barrier layer should not be formed on the terminal portion which is connected with the outside circuitry or the upper-lower conductive part connecting the upper and lower electrode bases with an electrically conductive material.

There are additional restrictions on the barrier layer, in a liquid crystal display panel, where the barrier layer is formed on the liquid crystal layer side of the substrate. For example, the orientating agent used should not cause the invasion of any deleterious substances into the liquid crystal from the orientating agent upon the calcination of the orientating agent, and so forth. However, this restriction is unnecessary when the barrier layer is formed on the opposite side of the substrate surface from the liquid crystal layer.

The barrier layer may be made of polyvinylidene chloride. A polyvinylidene chloride barrier layer acts as both a moisture and air barrier. A polyvinylidene chloride barrier layer is formed only on the outside surface of the substrate. This is necessary because if the barrier layer is formed on the display medium layer (e.g. liquid crystal) side, then during calcination of the orientating agent, chlorine ions and sometimes hydrochloric acid are formed from the polyvinylidene chloride and invade the display medium, (e.g. liquid crystal), thereby deteriorating the display medium (e.g. liquid crystal).

The barrier layer may also be made of polyvinyl alcohol (hereinafter referred to as PVA), which has excellent air barrier properties although it has weak moisture barrier properties. The PVA barrier layer can be formed on either surface of the substrate, that is on the display medium (e.g. liquid crystal) layer side or the opposite side.

The barrier layer may also be made of polyacrylonitrile (hereinafter referred to as PAN), in which case the barrier layer has excellent air barrier properties and weak moisture barrier properties. The PAN barrier layer may be formed on either surface of the substrate, that is on the display medium (e.g. liquid crystal) layer side or on the opposite side.

The barrier layer may also be formed of polyvinyl butyral (hereinafter referred to as PVB), in which case the barrier layer has high air barrier properties but weak moisture barrier properties. If the PVB barrier layer is formed on the display medium (e.g. liquid crystal) layer side, the lamination of the orientating agent with the barrier layer, by disolving the orientating agent in a solvent, causes the barrier agent to swell or tend to dissolve because the display medium (e.g. liquid crystal) is also a kind of organic solvent. The PVB barrier layer should therefore, be formed on the substrate surface on the side opposite to the display medium (liquid crystal) layer.

The barrier layer may also be made of a mixture of PVA and an acrylic resin. The proportion of the acrylic resin incorporated in the mixture is about 20–50% by weight based on the total composition, preferably about 30% by weight. Such a barrier layer may be formed on either surface of the substrate, that is, the display medium layer side or the opposite side. This barrier layer may also be formed as an ultraviolet curing type, and this is especially effective in resisting the invasion of moisture.

The barrier layer may also be made of a mixture of PVB and an epoxy type resin. In this case the epoxy type resin incorporated is about 10–40% by weight based on the total composition, and preferably, about 20% by weight. Such a barrier layer may be formed on either the inside or outside surfaces of the substrate.

The barrier layer may also be made of a combination of a coat of a urethane type primer and PAN layer thereon. The thickness of the urethane type primer necessary so that the base does not lose its flexibility is about 500 Å–5$\mu$ and preferably 1–2$\mu$. By using a urethane type primer the adhesion of the PAN to the substrate is enhanced.

The aforenoted organic type barrier layers possess sufficient moisture and air barrier properties if they are about 5$\mu$ thick or more. A thickness of about 5–50$\mu$ allows for flexibility while maintaining the desired barrier properties.

It is also possible to provide an acrylic undercoat layer on the substrate and form an organic type barrier layer thereon or on the surface opposite to the acrylic undercoat layer. The acrylic undercoat layer is made of an acrylic resin which is a thermosetting resin. Therefore, when the acrylic undercoat layer has been formed on the liquid crystal layer side of the substrate it does not react with and is not swollen by the solvent used to dissolve the orientating agent when the barrier layer is formed. The invasion of deleterious substances attributable to the various barrier layers into the display medium, which can occur during the formation of the barrier layer, may be prevented where the acrylic undercoat layer is formed on the display medium (e.g. liquid crystal) layer side rather than on the barrier layer side.

To achieve the above described effect the acrylic undercoat layer is formed to a thickness of about 500 Å or more. In order for the substrate to retain its flexibility (which means that the undercoat layer does not break when the substrate is bent), the thickness of the acrylic undercoat layer is suitably up to about 5$\mu$ and preferably 1–2$\mu$. An example is where an acrylic undercoat was formed on the base surface on the side opposite to the display medium (e.g. liquid crystal) layer, and thereafter a barrier layer of polyvinylidene chloride was formed.

In addition, PAN and PVA can act as both barrier layer and orientated layer.

INORGANIC TYPE BARRIER LAYER

One inorganic type barrier layer is a $SiO_2$ layer. This silicone dioxide layer may be formed on either surface of the substrate. Barrier properties are imparted with a thickness of about 0.5$\mu$ or more. In order that the base has flexibility, the thickness of the silicone dioxide layer is preferably about 0.5–2$\mu$ and more preferably about 1$\mu$. The silicone dioxide layer may be formed by deposition, spattering or by coating an organic or inorganic material containing Si and thereafter affecting a chemical reaction or heat treatment.

Another inorganic barrier layer is a phosphoric acid-iron type coating layer. A specific example is phosphate glass incorporating iron. A 5$\mu$ thickness can provide barrier properties. However, in order to secure both flexibility and barrier properties a thickness of about 10$\mu$ is preferred. This barrier layer may be formed on either side of the substrate but preferably on the opposite side from the display medium (e.g. liquid crystal) layer side.

As has been described above in detail, a display panel of, e.g. liquid crystal, constructed in accordance with the invention as above using flexible substrates to sandwich a display medium (e.g. liquid crystal), successfully avoids various problems which have been encountered in producing such display panels. First, where flexible substrates are used, it is generally difficult to bond the substrates to each other, sandwiching the display medium (e.g. liquid crystal), without causing any harm to the display medium (e.g. liquid crystal). However, when a display device using the display panel of, e.g. liquid crystal, constructed in accordance with this invention is constructed, the display panel having multiple seal parts is resistant to bending and thus handling of the display panel (of e.g. liquid crystal), which is easily bendable by a weak force during construction. Since a display panel (of e.g. liquid crystal), constructed in accordance with the invention may be used in a bent form, and the advantages of a display panel (of e.g. liquid crystal), composed of flexible substrates may be utilized to their maximum extent.

Further, even a display panel made using substrates composed of an innately hard substrate material or in a thick form and therefore difficult to bend can sometimes be made flexible by thinning the substrate. Where it is desired to make the display panel and consequently the display device thinner it is often necessary that the substrate, display panel and display device should be flexible. The multiple seal part and barrier layer of this invention are extremely useful for display panels and display devices in these situations.

It will thus be seen that the objects set forth above, among these made apparent from the preceding description, are efficiently attained and, since certain changes may be made in carrying out the above process and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A display panel, comprising:
    a pair of spaced apart flexible substrates;
    a display medium sandwiched therebetween; and
    multiple seal means deposited between the substrates for containing the display medium between the substrates and maintaining the substrates in spaced separation, including a first seal member of a material having the property of strongly adhering to the substrates and a second seal member having the property of low water permeability.

2. The display panel of claim 1, wherein the first seal member is discontinuous.

3. The display panel of claim 1, wherein one of the seal members is an inner seal in contact with the display medium and the other seal member is an outer seal surrounding said inner seal.

4. The display panel of claim 3, wherein said second seal member is the inner seal and said first seal member in the outer seal.

5. The display panel of claim 4, wherein the first seal member discontinously surrounds the second seal member.

6. The display panel of claim 3, wherein said first seal member is the inner seal and said second seal member is the outer seal.

7. The display panel of claim 6, wherein the first seal member is discontinuous and the second seal member continuously surrounds the first seal member.

8. The display panel of claim 1, wherein the flexible substrates are formed from one of the group of polyester type resins, cellulose type resins, such as cellulose diacetate, cellulose triacetate and cellulose acetate butyrate, polyethersulfone type resins, polysulfone type resins, acrylic resins, polyethylene terephthalate type resins, phenoxy type resins, phenoxy-urethane type resins, urethane type resins, polyether ketone type resins, polyether ether ketone type resins, polyether imide type resins, epoxy resins, polyimide type resins, polyamide type resins, polyimideamide type resins, polycarbonate type resins, resins obtained by mixing two or more of the above resins and resins obtained by laminating two or more of the above resins.

9. The display panel of claim 1, wherein the first seal member is formed from one of the group of silicone type resins, flexible epoxy type resins and polyester type resins.

10. The display panel of claim 1, wherein the second seal member is formed from one of the group of epoxy type resins and anaerobic ultraviolet curing resins.

11. The display panel of claim 10, wherein the anaerobic ultraviolet curing resin is acrylic.

12. The display panel of claim 1, wherein the first seal member is a silicone type resin and the second seal member is an epoxy type resin.

13. The display panel of claim 1, wherein the multiple seal means further comprises a third seal member for forming a low water permeability seal.

14. The display panel of claim 13, wherein the first, second and third seal members are concentrically arranged surrounding the display medium.

15. The display panel of claim 14, wherein the second seal member is in contact with and surrounds the display medium, the first seal member at least partially surrounds the second seal member and the third seal member continuously surrounds the first seal member.

16. The display panel of claim 14, wherein the first seal member is discontinuous around the second seal member.

17. The display panel of claim 13, wherein the second and third seal members are formed from the same material.

18. The display panel of claim 1, wherein the first seal member is discontinuous and contained within the second seal member.

19. The display panel of claim 1, further comprising electrodes on the opposed faces of the flexible substrate and electrically conducting means for electrically connecting the electrodes.

20. The display panel of claim 19 wherein the electrically conducting means is formed within the display medium.

21. The display panel of claim 19 wherein the electrically conducting means is formed within the first seal member.

22. The display panel of claim 19 wherein the electrically conducting means is formed within the second seal member.

23. The display panel of claim 1 further including a barrier layer on at least one of the flexible substrates.

24. The display panel of claim 23 wherein the barrier layer is formed from one of the group of polyvinylidine chloride, polyvinyl alcohol, polyacrylonitrile, mixtures of polyvinyl alcohol and acrylic resins and mixtures of polyvinyl butryral and epoxy type resins.

25. The display panel of claim 23 wherein the barrier layer is formed from one of the group of silicon dioxide and phosphoric acid-iron type substances.

26. The display panel of claim 23 wherein the barrier layer prevents the passage of one of air and water.

27. The display panel of claim 23 wherein the barrier layer is formed on the surface of at least one of the flexible substrates facing the display medium.

28. The display panel of claim 23 wherein the barrier layer is formed on the surface of at least one of the flexible substrates opposing the surface facing the display medium.

29. The display panel of claim 23 further including an acrylic undercoat layer.

30. The display panel of claim 29 wherein the acrylic undercoat layer has a thickness of about $0.5-5\mu$.

31. The display panel of claim 29 wherein the acrylic undercoat layer has a thickness of about $1-2\mu$.

32. The display panel of claim 1 wherein the display medium is a liquid crystal.

33. The display panel of claim 1 wherein the display medium is electrochromic.

34. The display panel of claim 1 wherein the display medium is electroluminescent.

35. The display panel of claim 1 wherein the display medium is electrophoretic.

36. The display panel of claim 1 wherein the display medium is magnetic.

37. The display panel of claim 1 wherein the flexible substrates have inherent polarizability.

38. A process for the production of a display panel having a pair of spaced apart flexible substrates and a display medium sandwiched therebetween, comprising:
depositing on the interior surface of one substrate a first sealant formed of a material having the property of strongly adhering to the substrates;
depositing on the interior surface of the other substrate, a second seal, formed of a material having the property of low water permeability;
scattering a spacer on at least one of the substrates;
combining the substrates together; and
curing the sealants to form a display panel.

39. The process of claim 38 wherein the first sealant which strongly adheres to the substrate is deposited in a discontinuous manner.

40. The process of claim 39 wherein the second seal is deposited in a discontinuous manner.

41. The process of claim 40 wherein the first and second seals become continuous when the substrates are combined together.

42. The process of claim 39 wherein the combination of the substrates causes the discontinuous first seal to become continuous.

43. The process of claim 39 further comprising forming a barrier layer on at least one of the substrates.

44. The process of claim 38 wherein the second seal is deposited in a discontinuous manner.

45. The proces of claim 44 wherein the second seal becomes continuous when the substrates are combined together.

46. The process of claim 38 wherein the sealants are cured by heating.

47. The process of claim 38 wherein the spacer is scattered by placing a substrate in a gas atmosphere in which the spacer is suspended.

48. The process of claim 38 wherein the spacer is scattered by placing a substrate in a liquid containing the suspended spacer and withdrawing the substrate at a constant rate.

49. The process of claim 38 wherein the spacer is scattered by spraying a solution of the spacer and a volatile solvent over a substrate.

50. The process of claim 38 further including applying an upper-lower conductive member.

51. The process of claim 38 further comprising printing a third seal, which has low water permeability on the one substrate.

52. The process of claim 38 further comprising filling the display panel with a display medium.

53. The process of claim 38 further comprising forming an edge barrier between the first sealant and the edge of the substrate.

54. The process of claim 38 further comprising forming a barrier layer on one of the substrates.

55. The process of claim 54 wherein the barrier layer is formed on the display medium side of the flexible substrate.

56. The process of claim 54 wherein the barrier layer is formed on the side of the substrate opposite to the display medium.

* * * * *